United States Patent
Feng et al.

(10) Patent No.: US 12,026,934 B2
(45) Date of Patent: Jul. 2, 2024

(54) SYSTEMS AND METHODS FOR TRAINING A CONVOLUTIONAL NEURAL NETWORK THAT IS ROBUST TO MISSING INPUT INFORMATION

(71) Applicants: Xue Feng, Lexington, KY (US); Quan Chen, Lexington, KY (US); Kanchan Ghimire, Arlington, VA (US)

(72) Inventors: Xue Feng, Lexington, KY (US); Quan Chen, Lexington, KY (US); Kanchan Ghimire, Arlington, VA (US)

( * ) Notice: Subject to any disclaimer, the term of this patent is extended or adjusted under 35 U.S.C. 154(b) by 342 days.

(21) Appl. No.: 17/531,720

(22) Filed: Nov. 20, 2021

(65) Prior Publication Data
US 2023/0162479 A1    May 25, 2023

(51) Int. Cl.
*G06V 10/774* (2022.01)
*G06N 3/04* (2023.01)
(Continued)

(52) U.S. Cl.
CPC ............. *G06V 10/774* (2022.01); *G06N 3/04* (2013.01); *G06V 10/25* (2022.01); *G06V 10/80* (2022.01); *G06V 10/95* (2022.01)

(58) Field of Classification Search
CPC ...... G06V 10/774; G06V 10/25; G06V 10/95; G06V 10/80; G06N 3/04
See application file for complete search history.

(56) References Cited

U.S. PATENT DOCUMENTS

| | | | |
|---|---|---|---|
| 2017/0249744 A1* | 8/2017 | Wang | G06T 1/60 |
| 2022/0237480 A1* | 7/2022 | Zhang | G06N 20/00 |
| 2023/0131675 A1* | 4/2023 | Kunz | G16H 10/40 |
| | | | 382/128 |

OTHER PUBLICATIONS

Wenlu Zhang et al, "Deep convolutional neural networks for multi-modality isointense infant brain image segmentation", 2015, NeuroImage 108, pp. 214-224 (11 Pages) (Year: 2015).*

* cited by examiner

*Primary Examiner* — David F Dunphy (57) ABSTRACT

The present disclosure relates to a method and apparatus for training a convolutional neural network (CNN) that is robust to missing input information. The method includes: receive a plurality of three-dimensional (3D) images per case obtained from a CT, an MRI, or a PET system or the combination thereof; receive accompanying metadata for each received 3D images, comprising pixel spacing, slice thickness, and matrix size; processing the received 3D images per case utilizing the received metadata of each 3D images to generate 4D images containing complimentary information from received imaging modalities, wherein the generated 4D images may miss a plurality of imaging modalities; further process the generated 4D images if the generated 4D images miss a plurality of imaging modalities, wherein the step comprises: fill the generated 4D images with a fixed value for all pixels of missed imaging modalities; build an adaptable deep learning framework using CNNs for image segmentation that utilizes the generated 4D images as input; train the CNNs with the generated 4D images to obtain segmentation labels for each region-of-interest (ROI) by emulating missing modality, wherein the step of emulating missing modality in training comprises: randomly decide whether or not to emulate; if decide to emulate, randomly select a plurality of input modalities to emulate as missing and fill the images with a fixed value for all pixels of the selected input modalities; and deploy the trained CNNs on 4D images generated from 3D images for each new testing case employing the steps of receiving and processing 3D images described above to obtain segmentation labels for each ROI, wherein the step of deployment comprises: accommodate missing modalities in generated 4D images by filling the images with the same fixed value used in training for missed modalities.

7 Claims, 5 Drawing Sheets

(51) Int. Cl.
*G06V 10/25* (2022.01)
*G06V 10/80* (2022.01)
*G06V 10/94* (2022.01)

SYSTEMS AND METHODS FOR TRAINING A CONVOLUTIONAL NEURAL NETWORK THAT IS ROBUST TO MISSING INPUT INFORMATION

STATEMENT OF GOVERNMENT INTEREST

This invention was made with government support under Grant No. R44CA254844 awarded by The National Institute of Health. The government has certain rights in the invention.

CROSS-REFERENCE TO RELATED APPLICATION

Not applicable.

FIELD

This disclosure relates to a deep learning framework using a convolutional neural network (CNN) that is robust to missing input information from tomographic images.

BACKGROUND

In recent years, CNN-based deep learning algorithms have shown great success in many medical image segmentation applications for single-modality images. However, for some segmentation tasks, complementary information from multiple imaging modalities is necessary for accurate segmentation. Effectively utilizing information from multiple imaging modalities is challenging for CNNs, especially when dealing with missing modalities where the model might fail completely if it learns to rely on the co-existence of different modalities. Although one solution is to train different networks for different combinations of imaging modalities, this will lead to a large number of networks and will be time consuming and also error-prone in deployment.

SUMMARY

Examples of the present disclosure provide a method for training a convolutional neural network that is robust to missing input information.

According to a first aspect of the present disclosure, a computer-implemented method for training a CNN that is robust to missing input information. The method may include receive a plurality of three-dimensional (3D) images per case obtained from a CT, an MRI, or a PET system or the combination thereof; receive accompanying metadata for each received 3D images, comprising pixel spacing, slice thickness, and matrix size; process the received 3D images per case utilizing the received metadata of each 3D images to generate 4D images containing complimentary information from received imaging modalities, wherein the generated 4D images may miss a plurality of imaging modalities; further process the generated 4D images if the generated 4D images miss a plurality of imaging modalities, wherein the step comprises: fill the generated 4D images with a fixed value for all pixels of missed imaging modalities; build an adaptable deep learning framework using CNNs for image segmentation that utilizes the generated 4D images as input; train the CNNs with the generated 4D images to obtain segmentation labels for each region-of-interest (ROI) by emulating missing modality, wherein the step of emulating missing modality in training comprises: randomly decide whether or not to emulate; if decide to emulate, randomly select a plurality of input modalities to emulate as missing and fill the images with a fixed value for all pixels of the selected input modalities; and deploy the trained CNNs on 4D images generated from 3D images for each new testing case employing the steps of receiving and processing 3D images described above to obtain segmentation labels for each ROI, wherein the step of deployment comprises: accommodate missing modalities in generated 4D images by filling the images with the same fixed value used in training for missed modalities.

According to a second aspect of the present disclosure, an apparatus for training a CNN that is robust to missing input information. The apparatus may include one or more processors, a display, and a non-transitory computer-readable memory storing instructions executable by the one or more processors. Wherein the instructions are configured to receive a plurality of three-dimensional (3D) images per case obtained from a CT, an MRI, or a PET system or the combination thereof; receive accompanying metadata for each received 3D images, comprising pixel spacing, slice thickness, and matrix size; process the received 3D images per case utilizing the received metadata of each 3D images to generate 4D images containing complimentary information from received imaging modalities, wherein the generated 4D images may miss a plurality of imaging modalities; further process the generated 4D images if the generated 4D images miss a plurality of imaging modalities, wherein the step comprises: fill the generated 4D images with a fixed value for all pixels of missed imaging modalities; build an adaptable deep learning framework using CNNs for image segmentation that utilizes the generated 4D images as input; train the CNNs with the generated 4D images to obtain segmentation labels for each region-of-interest (ROI) by emulating missing modality, wherein the step of emulating missing modality in training comprises: randomly decide whether or not to emulate; if decide to emulate, randomly select a plurality of input modalities to emulate as missing and fill the images with a fixed value for all pixels of the selected input modalities; and deploy the trained CNNs on 4D images generated from 3D images for each new testing case employing the steps of receiving and processing 3D images described above to obtain segmentation labels for each ROI, wherein the step of deployment comprises: accommodate missing modalities in generated 4D images by filling the images with the same fixed value used in training for missed modalities.

According to a third aspect of an example of the present disclosure, a non-transitory computer-readable storage medium having stored therein instructions is provided. When the instructions are executed by one or more processors or one or more graphic processing units of the apparatus, the instructions cause the apparatus to receive a plurality of three-dimensional (3D) images per case obtained from a CT, an MRI, or a PET system or the combination thereof; receive accompanying metadata for each received 3D images, comprising pixel spacing, slice thickness, and matrix size; process the received 3D images per case utilizing the received metadata of each 3D images to generate 4D images containing complimentary information from received imaging modalities, wherein the generated 4D images may miss a plurality of imaging modalities; further process the generated 4D images if the generated 4D images miss a plurality of imaging modalities, wherein the step comprises: fill the generated 4D images with a fixed value for all pixels of missed imaging modalities; build an adaptable deep learning framework using CNNs for image segmentation that utilizes the generated 4D images as input;

train the CNNs with the generated 4D images to obtain segmentation labels for each region-of-interest (ROI) by emulating missing modality, wherein the step of emulating missing modality in training comprises: randomly decide whether or not to emulate; if decide to emulate, randomly select a plurality of input modalities to emulate as missing and fill the images with a fixed value for all pixels of the selected input modalities; and deploy the trained CNNs on 4D images generated from 3D images for each new testing case employing the steps of receiving and processing 3D images described above to obtain segmentation labels for each ROI, wherein the step of deployment comprises: accommodate missing modalities in generated 4D images by filling the images with the same fixed value used in training for missed modalities.

Other aspects and features according to the example embodiments of the disclosed technology will become apparent to those of ordinary skill in the art, upon reviewing the following detailed description in conjunction with the accompanying figures.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

Reference will now be made to the accompanying drawings, which are not necessarily drawn to scale.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The present disclosure related to training a CNN that is robust to missing input information. To be specific, the framework handles different combination of input images from different modalities.

Figure 1:
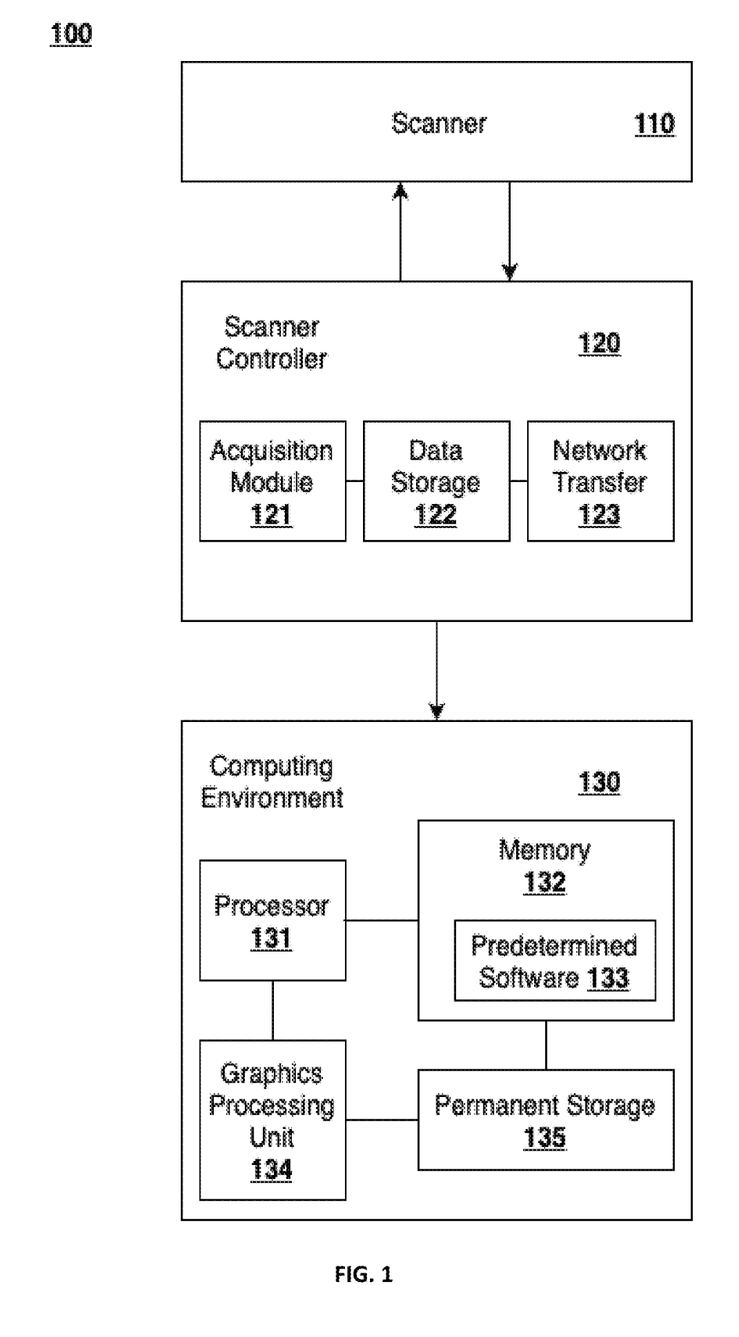
FIG. 1 is a system diagram of a scanner, controller, and computing environment illustrating an operating environment capable of implementing aspects of the present disclosure.

FIG. 1 shows a diagram of a scanner 110 which could be either CT scanner, MR scanner, PET scanner, or other medical imagining scanner, controller 120, and computing environment 130. The scanner 110, controlled by the scanner controller 120, is used to obtain images from single or multiple imaging modalities. The scanner controller 120 comprises the acquisition module 121 that drives the scanner 110, the data storage module 122 that stores single or multiple images of different subjects, and the network transfer module 123 that sends the images to the computing environment 130. The computing environment 130 comprises processor 131, graphics processing unit (GPU) 134, memory 132, and permanent storage 135. In executing the directions, the predetermined software 133 is loaded into memory 132 and executed by processor 131 to yield the desired output.

The scanner controller 120 is a processing component that controls the computer environment 130. The operations performed in scanner controller 120 include data acquisition, data communication, imaging processing and display. The processor 131 may include one or more processors, where a processor may be Central Processing Unit (CPU), a microprocessor, a single chip machine, a GPU, or the like. GPU 134 can include one or more GPUs interconnected to execute one or more GPU executable programs. The memory 132 is configured to store various types of data to support the operation of the computing environment 130. The memory 132 may be implemented by using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk. In an embodiment, the computing environment 130 may be implemented with one or more application specific integrated circuits (ASICs), digital signal processors (DSPs), digital signal processing devices (DSPDs), programmable logic devices (PLDs), field programmable gate arrays (FPGAs), GPUs, controllers, micro-controllers, microprocessors, or other electronic components, for performing the above methods.

An example of a predetermined software 133 is a deep learning framework for training a CNN that is robust to missing input information, which is installed on computer environment 130. The overall workflow is that when the computing environment 130 receives one or more images from scanner controller 120, the predetermined software 133 is executed to generate the segmentation results.

Figure 2:
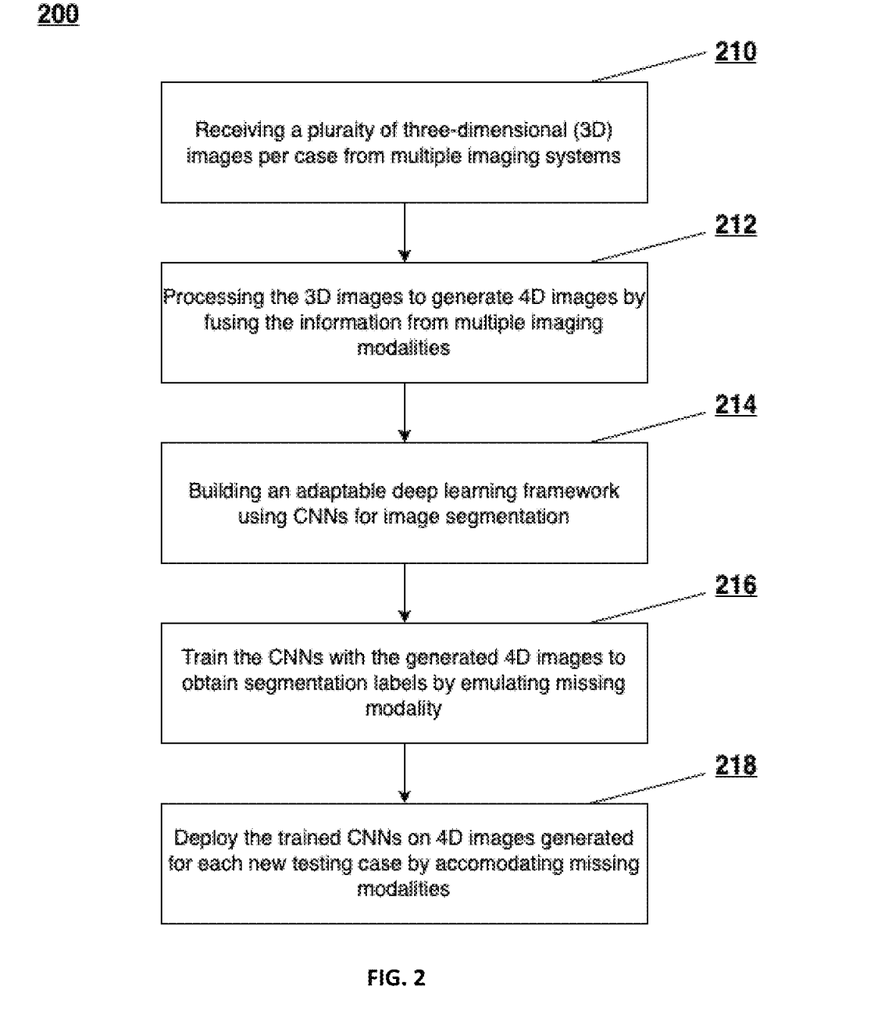
FIG. 2 is a flow chart illustrating a method for training a CNN that is robust to missing input information, according to an example of the present disclosure.

In step 210, one or multiple 3D images are received.

In step 212, multiple images for each subject case are processed to fuse the information from multiple imaging modalities.

Different scanners can have different imaging protocols relating pixel spacing and axial slice thickness. To reduce the variability within the dataset, the input images from both training and testing sets were uniformly resampled to have an axial in-plane resolution of 1×1 mm$^2$ and 1 mm slice-thickness. The steps in pre-processing include intensity cropping and normalization, generation of label maps and fusion of images for training cases. For CT images, the voxel intensity values outside of −1000 to 600 Hounsfield unit (HU) were set to −1000 and 600, respectively. Similarly, for other modality images the upper and lower threshold limits were decided based on the 95$^{th}$ and 1$^{st}$ percentile intensity values, and the values outside the upper and lower limit were set to those corresponding values. Finally, the images were normalized to the range [0, 1]. For training cases, of which the ground-truth contours were available, the corresponding label maps were generated using the same pre-processing pipeline with the values at each voxel indicating its region-of-interest (ROI) label. Since our method allows for missing modalities (or missing input information), each subject will have one or more modality images. The 3D images from multi-modality images are resampled to have the same field-of-view by either cropping or padding the images. Then, for each subject, 3D images from multiple modalities are fused along the last dimension so that the input image has multiple channels. For missing modalities, the images are emulated by creating a matrix of all fixed value and fusing that with images from other modalities.

In step 214, a deep learning framework using CNNs is built for segmentation.

Figure 3:
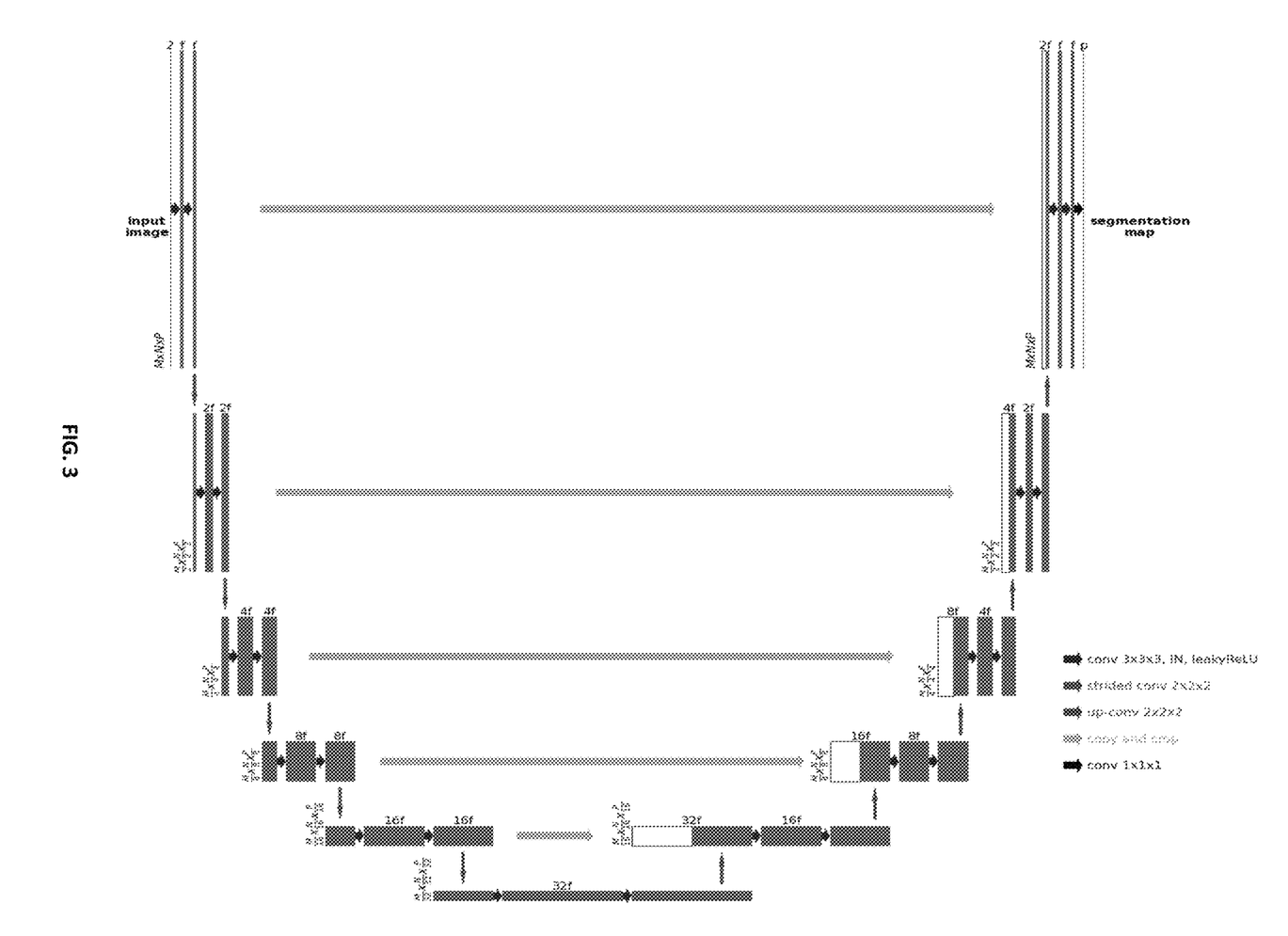
FIG. 3 is a CNN structure, according to an example of the present disclosure.
Figure 4A:
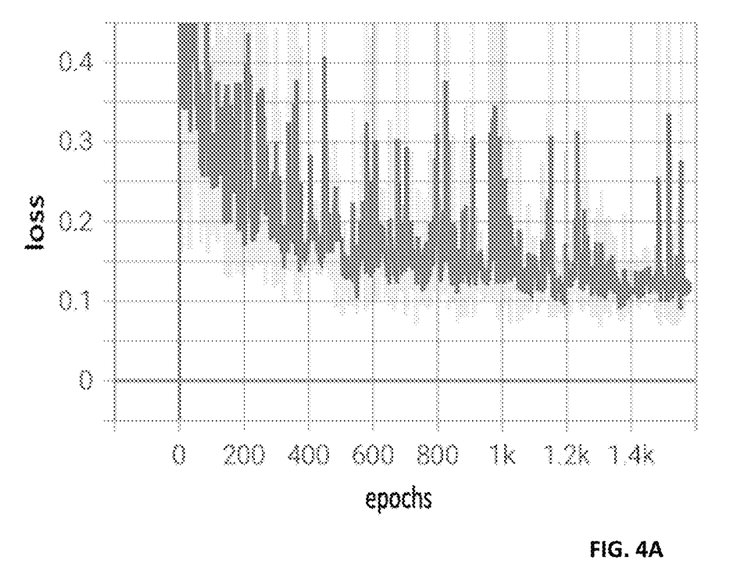
FIG. 4A is a loss curve for training on images during the CNN training process according to an example of the present disclosure.
Figure 4B:
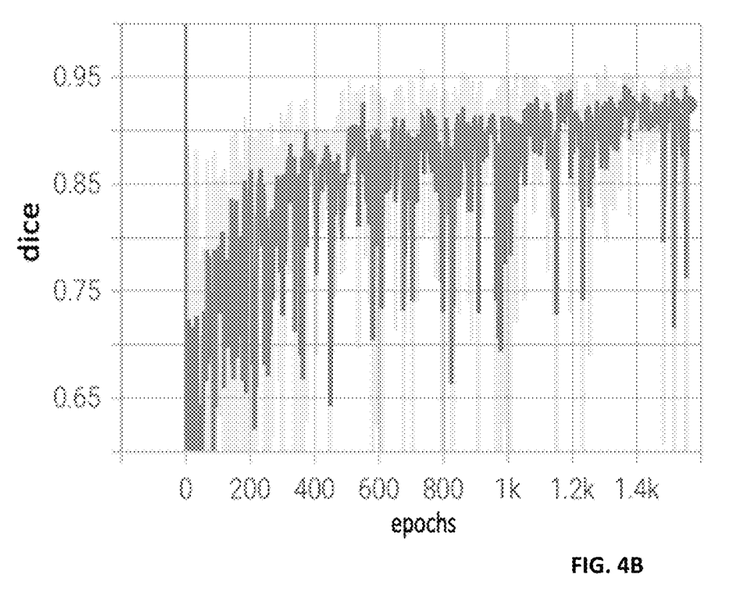
FIG. 4B is a dice curve for training on images during the CNN training process according to an example of the present disclosure.

FIG. 3 shows a 3D U-Net built using CNNs. A 3D U-Net network structure with 5 encoding and 5 decoding blocks was used. For each encoding block, a Visual Geometry Group (VGG)-like network, where two consecutive 3D convolutional layers were used with a kernel size of 3. Each block was followed by an instance normalization layer and a leaky rectified linear unit (ReLU) activation function. A large number of features (32) were used in the first encoding block to improve the expressiveness of the network. Like the conventional U-Net structure, the spatial dimension was halved while the number of features was doubled during each encoding block. For the decoding blocks, symmetric blocks were used with skip-connections from corresponding encoding blocks, with 3D convolutional layers replaced by 3D transposed convolutional layers. Features were concatenated to the deconvolution outputs, and the segmentation map of the input patch was expanded to the multi-class ground truth labels. The input images are of the shape M×N×P×s, where M is the image size along the superior-inferior direction, N is along the anterior-posterior direction, P is along the left-right direction and s is the number of imaging modalities supported by the model.

A patch-based segmentation technique is used to overcome challenges associated with training 3D U-Net models on large 3D images. Some of the challenges include large memory requirement, long training time, and class imbalance. For a moderate GPU (about 12 Gb) to fit a model trained on whole 3D images in memory, the network needs to greatly reduce the number of features and/or the layers which often results in significant performance drop. Similarly, the training time will increase significantly, as more voxels contribute to calculation of the gradients at each step, and the number of steps cannot be proportionally reduced during optimization. Finally, the class imbalance issue can be attributed to smaller proportions of the foreground (tumor) compared to the background for large images. Therefore, to utilize the training data more effectively, a patch-based segmentation approach was applied where smaller patches are extracted from each subject.

In step 216, the deep learning framework is adapted to handle either a single missing input modality or multiple modalities by emulating missing modalities in training. In medical imaging, images from multiple modalities can provide complementary information. For example, CT and PET have complementary information in detecting primary tumors, such that CT images contain structural information and PET images contain metabolic information about the tumor. In this case, the combined information can improve the detection and segmentation of the lesion. However, in clinical practice, images from all modalities might not be readily available.

Figure 5A:
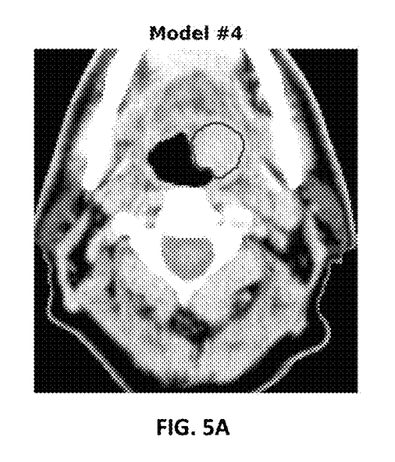
FIG. 5A is an axial slice illustrating the CT image and the segmentation according to an example of the present disclosure.
Figure 5B:
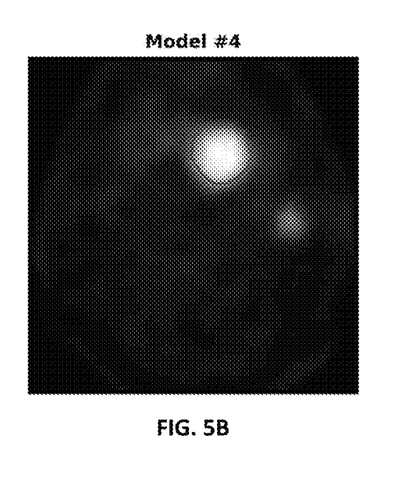
FIG. 5B is an axial slice illustrating the PET image and the segmentation according to an example of the present disclosure.

Unlike human readers who can take full advantage of all available information in this scenario, a network trained conventionally with all modalities as the input may not be able to extract all information when a case has missing modality or may completely fail if it learns to rely on the co-existence of different input modalities. Although one solution is to train different networks for different combinations of input modalities, this will lead to a large number of networks (e.g. 15 combinations with four modalities) and will be time consuming and error-prone in deployment. Therefore, we propose a novel method by introducing a "channel-dropout" method to increase the robustness of the trained model in deployment against missing input information. By randomly removing one or more modalities in the training process, this prevents the network from learning the co-adaptations of different input modalities and therefore will be able to adapt to different combinations of inputs in deployment without switching models. FIG. 5 shows the result of a model trained with combined modalities (CT and PET) and deployed on individual CT and PET modalities, respectively.

In step 218, the trained CNNs are deployed on 4D images generated for each new testing case by accommodating missing modalities. Testing cases comprise of a plurality of 3D images from a real-world scenario where one or multiple imaging modalities may be missing in clinical practice. Similar to image processing of training cases, testing cases will be processed to generate 4D images prior to sending as an input to the network/model. The generated 4D images will be filled with the same fixed value used in training for missed modalities. Finally, gaussian smoothing as post-processing is applied to obtain the final image segmentation.

For further evaluation, when ground-truth contours are available, the automatic segmentation results can be evaluated using the Dice coefficient, mean surface distance (MSD), and 95% Hausdorff distance. The Dice coefficient (D) is calculated as:

$$D = \frac{2|X \cap Y|}{|X| + |Y|}$$

where X and Y are the ground truth and the algorithm-segmented contours, respectively. The directed average Hausdorff measure is the average distance of a point in X to its closest point in Y, given as $$\vec{d}_{H,avg}(X, Y) = \frac{1}{|X|} \sum_{x \in |X|} \min_{y \in |Y|} d(x, y)$$

The MSD is then defined as the average of the two directed average Hausdorff measures:

$$MSD = \frac{\vec{d}_{H,avg}(X, Y) + \vec{d}_{H,avg}(Y, X)}{2}$$

The 95% directed percent Hausdorff measure is the $95^{th}$ percentile distance over all distances from points in X to their closest point in Y. Denoting the $95^{th}$ percentile as $K_{95}$, this is given as:

$$\vec{d}_{H,95}(X, Y) = K_{95}(\min_{y \in |Y|} d(x, y)) \ \forall \ x \in X$$

The undirected 95% Hausdorff distance (HD95) is then defined as the average of the two directed distances:

$$HD95 = \frac{\vec{d}_{H,95}(X, Y) + \vec{d}_{H,95}(Y, X)}{2}$$

What is claimed is:

1. A computer-implemented method for training a CNN that is robust to missing input information using one or more processors, the method comprising:
    receive a plurality of three-dimensional (3D) images per case obtained from a CT, an MRI, or a PET system or the combination thereof;
    receive accompanying metadata for each received 3D images comprising pixel spacing, slice thickness, and matrix size;
    process the received 3D images per case utilizing the received metadata of each 3D images to generate 4D images containing complimentary information from received imaging modalities, wherein the generated 4D images may miss a plurality of imaging modalities;
    further process the generated 4D images if the generated 4D images miss a plurality of imaging modalities, wherein the step comprises;
    fill the generated 4D images with a fixed value for all pixels of missed imaging modalities;
    build an adaptable deep learning framework using CNNs for image segmentation that utilizes the generated 4D images as input;
    train the CNNs with the generated 4D images to obtain segmentation labels for each region-of-interest (ROI) by emulating missing modality,
    wherein the step of emulating missing modality in training comprises:
    randomly decide whether or not to emulate;
    if decide to emulate,
    randomly select a plurality of input modalities to emulate as missing and fill the images with a fixed value for all pixels of the selected input modalities; and
    deploy the trained CNNs on 4D images generated from 3D images for each new testing case employing the steps of receiving and processing 3D images described above to obtain segmentation labels for each ROI,
    wherein the step of deployment comprises:
    accommodate missing modalities in generated 4D images by filling the images with the same fixed value used in training for missed modalities.

2. The computer-implemented method for training a CNN that is robust to missing input information according to claim 1, wherein the step of process the received multiple 3D images per case utilizing the received metadata of each 3D images to generate 4D images containing complimentary information from received imaging modalities comprises:
    resample the received 3D images for each case to have the same pixel spacing and matrix size;
    apply lower and upper thresholds on the image intensities based on imaging modality;
    merge 3D images from different modalities together to form 4D images by concatenating images from different modalities as different input channels.

3. The computer-implemented method for training a CNN that is robust to missing input information according to claim 1, wherein the step of randomly select a plurality of input modalities during training and fill the images with a fixed value for all pixels of the selected input modalities comprises:
    randomly select number of missing modalities to emulate with a set relative probability;
    check for missed modalities by identifying input channels in the generated 4D images containing same values for all pixels;
    if missed modalities identified,
    decrease the number of modalities to emulate by the number of missed modalities identified; and
    after determining the number of missing modalities to emulate, if the number of modalities to emulate is a positive number, randomly choose specific modalities up to the number specified using uniform probability distribution.

4. An apparatus for training a CNN that is robust to missing input information, comprising:
    one or more processors;
    a display; and
    a non-transitory computer readable memory storing instructions executable by the one or more processors, wherein the instructions comprising:
    receive a plurality of three-dimensional (3D) images per case obtained from a CT, an MRI, or a PET system or the combination thereof;
    receive accompanying metadata for each received 3D images, comprising pixel spacing, slice thickness, and matrix size;
    process the received 3D images per case utilizing the received metadata of each 3D images to generate 4D images containing complimentary information from received imaging modalities, wherein the generated 4D images may miss a plurality of imaging modalities;
    further process the generated 4D images if the generated 4D images miss a plurality of imaging modalities,
    wherein the step comprises:
    fill the generated 4D images with a fixed value for all pixels of missed imaging modalities;
    build an adaptable deep learning framework using CNNs for image segmentation that utilizes the generated 4D images as input;

train the CNNs with the generated 4D images to obtain segmentation labels for each region-of-interest (ROI) by emulating missing modality,
wherein the step of emulating missing modality in training comprises;
randomly decide whether or not to emulate;
if decide to emulate,
randomly select a plurality of input modalities to emulate as missing and fill the images with a fixed value for all pixels of the selected input modalities; and
deploy the trained CNNs on 4D images generated from 3D images for each new testing case employing the steps of receiving and processing 3D images described above to obtain segmentation labels for each ROI,
wherein the step of deployment comprises:
accommodate missing modalities in generated 4D images by filling the images with the same fixed value used in training for missed modalities.

5. The apparatus for training a CNN that is robust to missing input information according to claim 4, wherein the method further comprises:
resample the received 3D images for each case to have the same pixel spacing and matrix size;
apply lower and upper thresholds on the image intensities based on imaging modality; and
merge 3D images from different modalities together to form 4D images by concatenating images from different modalities as different input channels.

6. The apparatus for training a CNN that is robust to missing input information according to claim 4, wherein the step of randomly select one or multiple input modalities during training and fill the images with minimal value comprises:
randomly select number of missing modalities to emulate with a set relative probability;
check for missed modalities by identifying input channels in the generated 4D images containing same values for all pixels;
if missed modalities identified,
decrease the number of modalities to emulate by the number of missed modalities identified; and
after determining the number of missing modalities to emulate, if the number of modalities to emulate is a positive number, randomly choose specific modalities up to the number specified using uniform probability distribution.

7. A non-transitory computer-readable storage medium having stored therein instructions that, when executed by one or more processors of an apparatus causing the apparatus to perform acts comprising:
receive a plurality of three-dimensional (3D) images per case obtained from a CT, an MRI, or a PET system or the combination thereof;
receive accompanying metadata for each received 3D images, comprising pixel spacing, slice thickness, and matrix size;
process the received 3D images per case utilizing the received metadata of each 3D images to generate 4D images containing complimentary information from received imaging modalities, wherein the generated 4D images may miss a plurality of imaging modalities;
further process the generated 4D images if the generated 4D images miss a plurality of imaging modalities,
wherein the step comprises:
fill the generated 4D images with a fixed value for all pixels of missed imaging modalities;
build an adaptable deep learning framework using CNNs for image segmentation that utilizes the generated 4D images as input;
train the CNNs with the generated 4D images to obtain segmentation labels for each region-of-interest (ROI) by emulating missing modality,
wherein the step of emulating missing modality in training comprises;
randomly decide whether or not to emulate;
if decide to emulate,
randomly select a plurality of input modalities to emulate as missing and fill the images with a fixed value for all pixels of the selected input modalities; and
deploy the trained CNNs on 4D images generated from 3D images for each new testing case employing the steps of receiving and processing 3D images described above to obtain segmentation labels for each ROI,
wherein the step of deployment comprises:
accommodate missing modalities in generated 4D images by filling the images with the same fixed value used in training for missed modalities.

* * * * *